(12) United States Patent
Tanahashi et al.

(10) Patent No.: US 10,207,664 B2
(45) Date of Patent: Feb. 19, 2019

(54) VEHICLE AND MANUFACTURING METHOD THEREOF

(71) Applicant: TOYOTA JIDOSHA KABUSHIKI KAISHA, Toyota-shi, Aichi-ken (JP)

(72) Inventors: Toshio Tanahashi, Susono (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/634,224

(22) Filed: Jun. 27, 2017

(65) Prior Publication Data

US 2018/0001852 A1 Jan. 4, 2018

(30) Foreign Application Priority Data

Jun. 29, 2016 (JP) ................................. 2016-129243

(51) Int. Cl.
*B60R 16/06* (2006.01)
*B60K 6/28* (2007.10)
*B60K 6/405* (2007.10)
*B62D 65/02* (2006.01)

(52) U.S. Cl.
CPC ................ *B60R 16/06* (2013.01); *B60K 6/28* (2013.01); *B60K 6/405* (2013.01); *B62D 65/02* (2013.01); *B60Y 2410/115* (2013.01); *Y10S 903/951* (2013.01)

(58) Field of Classification Search
CPC ..... H02J 1/00; H02J 7/00; H02J 7/027; B60R 16/06; B60R 6/28; B60R 6/405; B62D 65/02
See application file for complete search history.

(56) References Cited

U.S. PATENT DOCUMENTS

| 6,235,385 | B1* | 5/2001 | Lee ....................... H05K 9/0067 |
| | | | 428/344 |
| 7,248,454 | B2* | 7/2007 | Takayanagi ............. H01T 23/00 |
| | | | 361/212 |
| 7,684,169 | B1* | 3/2010 | Larkin ....................... H05F 3/02 |
| | | | 361/231 |
| 2016/0280162 | A1* | 9/2016 | Yamada ................. B62D 35/00 |

FOREIGN PATENT DOCUMENTS

JP 2010-177128 A 8/2010

* cited by examiner

*Primary Examiner* — James A Shriver, II
*Assistant Examiner* — James J Triggs
(74) *Attorney, Agent, or Firm* — Hunton Andrews Kurth LLP

(57) ABSTRACT

A vehicle which can neutralize static electricity accumulating on a vehicle body, and a manufacturing method thereof are provided. The vehicle comprises: a vehicle body sustained by tires; a battery; an earth cable electrically connecting a negative terminal of the battery to the vehicle body; a predetermined member connected to the vehicle body while being insulted to the vehicle body; a main self-discharge device that neutralizes the predetermined member; and a conducting member that connects a neutralizing area of the predetermined member that is neutralized by the main self-discharge device to the negative terminal of the battery or the earth cable.

16 Claims, 9 Drawing Sheets

VEHICLE AND MANUFACTURING METHOD THEREOF

The present invention claims the benefit of Japanese Patent Application No. 2016-129243 filed on Jun. 29, 2016 with the Japanese Patent Office, the disclosures of which are incorporated herein by reference in its entirety.

BACKGROUND

Field of the Invention

Embodiments of the present invention relate to the art of an automobile comprising a battery supplying electricity to a drive motor and electrical auxiliaries.

Discussion of the Related Art

JP-A-2010-177128 describes an example of a vehicle battery for supplying electricity to auxiliaries. According to the teachings of JP-A-2010-177128, a lid of the battery is made of resin, and a static electricity induction member is attached to the lid to induct static electricity on a person to be contacted to the battery to a vehicle body. Specifically, the static electricity induction member is attached to the lid at a position where gas remaining in the battery or discharged from the battery will not be ignited by a spark of static electricity discharged from the static electricity induction member.

Electrical equipment to which electricity is supplied from the battery such as a drive motor and electrical auxiliaries may be charged with static electricity resulting from activation. Since a negative terminal of the electrical equipment is connected to the vehicle body, the static electricity on the electrical equipment may be conducted to the vehicle body. In addition, during propulsion of the vehicle, static electricity may accumulate on the vehicle body for a reason of friction between a surface of the vehicle body and external airstream. However, tires are made of electrical resistance material such as rubber, and hence the static electricity accumulating on the electrical equipment and the vehicle body may not be discharged to a road surface and remain on the vehicle body. Consequently, separation of the airflow form a surface of the vehicle body may be caused by repulsive force acting between surface of the vehicle body and the ionized airflow of same polarity. For this reason, desired aerodynamic characteristics of the vehicle may not be achieved and hence acceleration and turning performance of the vehicle may be degraded.

SUMMARY

Aspects of embodiment of the present disclosure have been conceived noting the foregoing technical problems, and it is therefore an object of embodiments of the present disclosure is to provide a vehicle which can neutralize static electricity accumulating on a vehicle body, and a manufacturing method thereof.

According to one aspect of the present disclosure, there is provided with a vehicle comprising: a vehicle body sustained by tires in such a manner that an electrical resistance between the tire and a road surface is kept to be greater than a first predetermined value; and a battery that supplies electricity to a predetermined electrical device. In order to achieve the above-explained objective, according to the embodiment of the present disclosure, the vehicle is provided with: an earth cable that electrically connects a negative terminal of the battery to the vehicle body; a predetermined member that is connected to the vehicle body while keeping an electrical resistance between the predetermined member and the vehicle body greater than a second predetermined value; a main self-discharge device that decreases a potential of the predetermined member by causing a self-discharge to produce ions charged to an opposite polarity to a polarity of the predetermined member in an airflow flowing along a surface of the predetermined member according to the potential; and a conducting member that connects a neutralizing area of the predetermined member that is neutralized by the main self-discharge device to the negative terminal of the battery or the earth cable while keeping an electrical resistance between the neutralizing area and the negative terminal or the earth cable smaller than a third predetermined value.

In a non-limiting embodiment, the predetermined member may be made of material that is electrically charged easier than metal material.

In a non-limiting embodiment, the predetermined member may be made of resin material.

In a non-limiting embodiment, the vehicle may further comprise a prime mover, and a cover member that covers the prime mover. In addition, the predetermined member may include the cover member.

In a non-limiting embodiment, the vehicle may further comprise an engine serving as a prime mover. In addition, the engine may include a cylinder block having a plurality of cylinder bores, a cylinder head that closes the cylinder bores of the cylinder block, and a head cover that covers the cylinder head. In addition, the predetermined member may include the head cover.

In a non-limiting embodiment, the vehicle may further comprise a prime mover, and a duct that allows external air to flow toward the prime mover. In addition, the predetermined member may include the duct.

In a non-limiting embodiment, the vehicle may further comprise a plate member to which the main self-discharge device is attached. In addition, the plate member may be attached to the predetermined member.

In a non-limiting embodiment, the main self-discharge device may include a coating material that is applied to an outer surface of the predetermined member.

In a non-limiting embodiment, the coating material may contain at least one of metallic material and carbon fiber.

In a non-limiting embodiment, the main self-discharge device may cover a predetermined area of the outer surface of the predetermined member. In addition, the vehicle may further comprise a sub self-discharge device that is applied to the predetermined member at a different site from a site to which the main self-discharge device is applied. Specifically, the sub self-discharge device may also be adapted to decrease the potential of the predetermined member by causing a self-discharge to produce ions charged to the opposite polarity to the polarity of the predetermined member in the airflow flowing along the surface of the predetermined member according to the potential In a non-limiting embodiment, the sub self-discharge device may also be applied to a specific point of the vehicle body.

In a non-limiting embodiment, a surface area of the main self-discharge device may be determined in such a manner as to achieve predetermined aerodynamic characteristics.

In a non-limiting embodiment, the surface area may include an effective discharging area to cause the self-discharge that is 10625 $mm^2$.

In a non-limiting embodiment, the surface area of the main self-discharge device (33a) and a surface area of the sub self-discharge device (33b) are determined in such a manner as to achieve predetermined aerodynamic characteristics in total.

In a non-limiting embodiment, the surface areas of the main self-discharge device and the sub self-discharge device may include an effective discharging area to cause the self-discharge, and a total surface area of the main self-discharge device and the sub self-discharge device may be 10625 mm².

In a non-limiting embodiment, one of end portions of the conducting member may be connected to an area around 100 mm from an outer edge of the self-discharge device.

According to another aspect of the present disclosure, there is provided with a manufacturing method of a vehicle in which a vehicle body is sustained by tires in such a manner that an electrical resistance between the tire and a road surface is kept to be greater than a first predetermined value, and in which a battery is mounted on the vehicle body. The manufacturing method may comprise: connecting a negative terminal of the battery to the vehicle body through an earth cable; connecting a predetermined member to the vehicle body while keeping an electrical resistance between the predetermined member and the vehicle body greater than a second predetermined value; attaching a main self-discharge device that decreases a potential of the predetermined member by causing a self-discharge to produce ions charged to an opposite polarity to a polarity of the predetermined member in an airflow flowing along a surface of the predetermined member according to the potential, to the predetermined member; and connecting a neutralizing area of the predetermined member that is neutralized by the main self-discharge device to the negative terminal of the battery or the earth cable while keeping an electrical resistance between the neutralizing area and the negative terminal or the earth cable smaller than a third predetermined value.

In a non-limiting embodiment, the manufacturing method may further comprise: determining an area of the main self-discharge device based on predetermined aerodynamic characteristics; and attaching the main self-discharge device to the predetermined member in the determined area.

In a non-limiting embodiment, the manufacturing method may further comprise: determining whether or not the aerodynamic characteristics of the vehicle in which the main self-discharge device is attached to the predetermined member fulfills a predetermined criterion; and applying a sub self-discharge device that decreases a potential of the predetermined member by causing a self-discharge to produce ions charged to an opposite polarity to a polarity of the predetermined member in an airflow flowing along a surface of the predetermined member according to the potential, to the predetermined member around the main self-discharge device within an area possible to fulfil the criterion, in a case that the aerodynamic characteristics of the vehicle does not fulfill the criterion.

In a non-limiting embodiment, the manufacturing method may further comprise: determining whether or not the aerodynamic characteristics of the vehicle in which the main self-discharge device is attached to the predetermined member fulfills a predetermined criterion; and applying a sub self-discharge device that decreases a potential of the predetermined member by causing a self-discharge to produce ions charged to an opposite polarity to a polarity of the predetermined member in an airflow flowing along a surface of the predetermined member according to the potential, to a specific point of the vehicle body within an area possible to fulfil the criterion, in a case that the aerodynamic characteristics of the vehicle does not fulfill the criterion.

Thus, according to the embodiment of the present disclosure, the negative terminal of the battery is connected to the vehicle body through the earth cable, and the negative terminal or the earth cable is connected to the predetermined member connected to the vehicle body while keeping an electrical resistance there between greater than a second predetermined value. In addition, the main self-discharge device that decreases a potential of the predetermined member is attached to the predetermined member, and one of the end portions of conducting member is connected to the neutralizing area of the predetermined member that is neutralized by the main self-discharge device. According to the embodiment of the present disclosure, static electricity accumulating on the vehicle body is conducted to the neutralizing area of the predetermined member through the negative terminal or the earth cable, and neutralized by the main self-discharge device and external air. Consequently, potential of the vehicle body is reduced so that repulsive force acing between the external airflow and a surface of the vehicle body may be reduced to ensure desired aerodynamic characteristics of the vehicle. For this reason, desired acceleration and turning performance of the vehicle may be ensured.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENTS

The embodiment of the present disclosure is applied to vehicles having a battery for supplying electricity to a drive motor and auxiliaries including a hybrid vehicle powered by an engine and the drive motor, an electric vehicle powered only by the drive motor, and a vehicle powered only by the engine. Accordingly, a prime mover of the vehicle to which the embodiment of the present disclosure is applied includes an engine and a drive motor.

Figure 1:
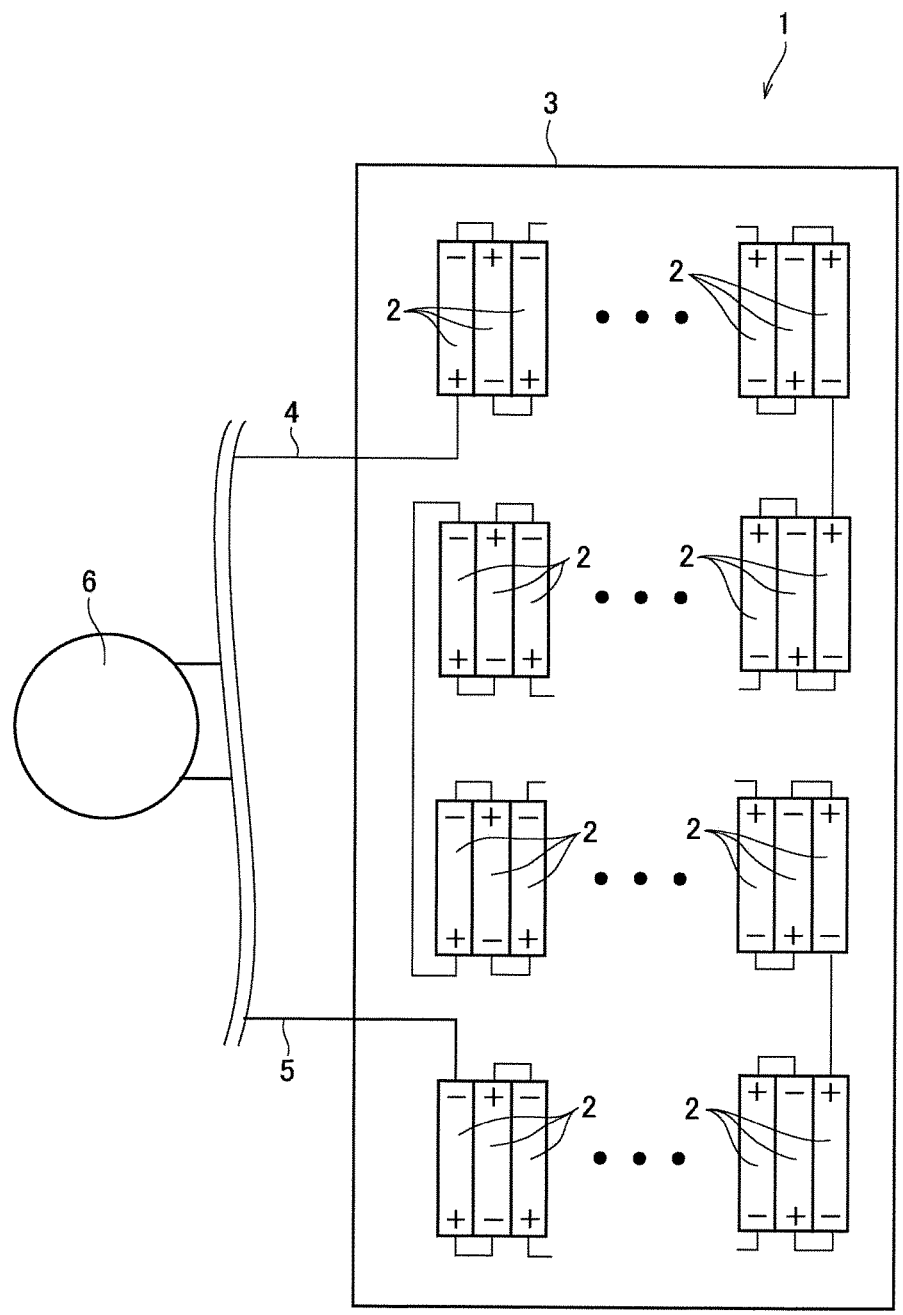
FIG. 1 is a perspective view showing one example of structure of a drive battery.

In the hybrid vehicles and the electric vehicles, a rechargeable secondary battery and a capacitor are arranged to serve as a drive battery, and the drive battery is electrically connected to the drive motor. Turning now to FIG. 1, there is shown one example of the drive battery. As illustrated in FIG. 1, in the drive battery 1, cell stacks individually formed of a plurality of single cells 2 are held in a casing 3. The single cells 2 are connected to each other in series to achieve a desired voltage of the cell stack. A positive terminal 4 and a negative terminal 5 extend from the single cells 2 to outside of the casing 3 to be connected to the drive motor 6.

Figure 2:
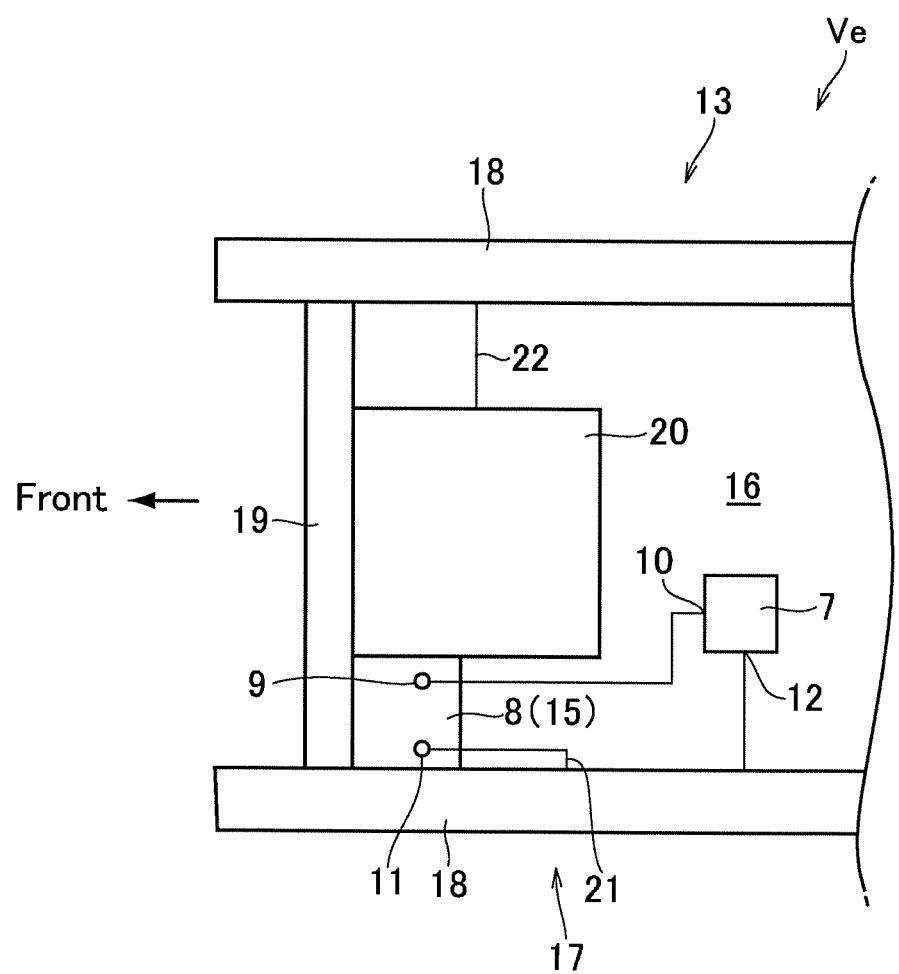
FIG. 2 is a schematic illustration showing an installation example of the battery in a vehicle body.

As illustrated in FIG. 2, the vehicle Ve to which the embodiment of the present disclosure is applied is provided with a battery 8 for supplying electricity to an electrical device 7 as an auxiliary. The electrical device 7 includes a headlamp, a brake lamp, a navigation system and a power control system having an inverter and a converter for controlling electricity supplied to the drive motor 6. A positive terminal 9 of the battery 8 is connected to a positive electrode 10 of the electrical device 7, and a negative terminal 11 of the battery 8 and a negative electrode 12 of the electrical device 7 are connected to a vehicle body 13. Both of the drive battery 1 and the battery 8 correspond to the battery of the present disclosure, and the vehicle Ve provided with the battery 8 will be explained in the following.

Figure 3:
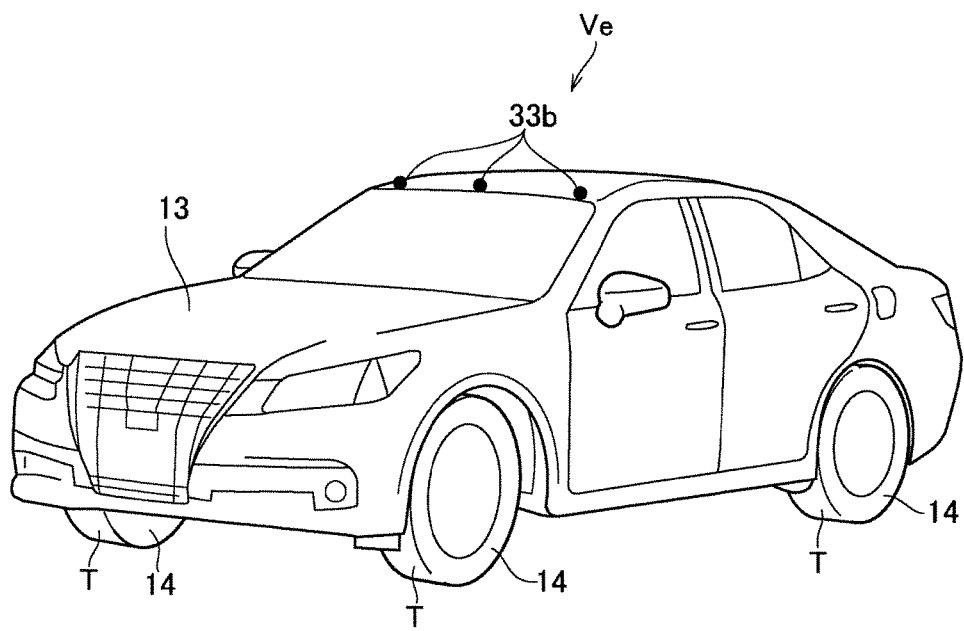
FIG. 3 is perspective view showing one example of a vehicle to which an embodiment of the present disclosure is applied.

Turning to FIG. 3, there is shown one example of the vehicle Ve. In the vehicle Ve, the vehicle body 13 made of metallic material or resin material is sustained by tires 14 individually made of electrical resistance material such as rubber. That is, the vehicle body 13 is insulated from a road surface. In the vehicle Ve, therefore, static electricity generated on the vehicle body 13 is not allowed to be discharged to a road surface and accumulated on the vehicle body 13. Here, the electrical resistance of the tires 14 corresponds to a "first predetermined value" of the embodiment.

Turning back to FIG. 2, there is shown an installation example of the battery 8 to the vehicle body 13. As illustrated in FIG. 2, the battery 8 includes an insulation case 15 made of resin, and a board (not shown) partitioning an internal space of the insulation case 15. Each internal space divided by the board is individually filled with electrolysis solution, and a positive board and a negative board (neither of which are shown) are partially immersed in the electrolysis solution. The positive terminal 9 is integrated with the positive board in such a manner as to protrude upwardly from the insulation case 15, and the negative terminal 11 is integrated with the negative board in such a manner as to protrude upwardly from the insulation case 15. The insulation case 15 is fixed in an engine room 16 formed in the front part of the vehicle body 13.

Specifically, the battery 8 is fixed to a front member 17 extending forward of the vehicle body 13 by a fixing member such as a bolt. The front member 17 includes a pair of side members 18 as frame members extending in a longitudinal direction along both sides of the vehicle body 13, and a lateral member 19 having higher rigidity that connects the side members 18. In the engine room 16, an engine 20 is disposed adjacent to the insulation case 15 while being fixed to the front member 17 by a fixing member such as an engine mount and a bolt (neither of which are shown). The negative terminal 11 and the engine 20 are electrically connected to the front member 17 through earth cables 21 and 22.

During propulsion of the vehicle Ve, a tread surface T of each of the tires 14 is repeatedly brought into contact to and isolated from the road surface, and static electricity resulting from such repetition of contact and isolation of the tread surface T to/from the road surface may accumulate on the tires 14. In addition, static electricity may also accumulate on sliding portions between a piston and a cylinder bore, between gears etc. Further, since the negative electrode 12 of the electrical device 7 are connected to a vehicle body 13, static electricity resulting from activation of the electrical device 7 may also accumulate on the vehicle body 13.

If static electricity in the airflow flowing along the vehicle body 13 is charged to the same polarity as the static electricity accumulating on the vehicle body 13, the airflow may be separated from a surface of the vehicle body 13 by repulsive force acing between the airflow and the vehicle body 13 thereby degrading acceleration and turning performance of the vehicle.

In order to eliminate the static electricity, according to the embodiment of the present disclosure, a self-discharge device is attached to a site on which static electricity may accumulate. Specifically, the self-discharge device is adapted to cause a corona discharge according to the potential thereof. As a result of the corona discharge from the self-discharge device, ions charged to an opposite polarity to the polarity of the self-discharge device are produced in the airflow flowing along a surface of the self-discharge device. In this situation, since the polarity of the self-discharge device and the polarity of the site to which the self-discharge device is attached are identical to each other, the static electricity accumulating around the self-discharge device is neutralized by the ions contained in the airflow flowing along the surface of the self-discharge device.

As well known in the art, the corona discharge is caused at a sharp point of a charged object. In order to cause such corona discharge, for example, the self-discharge device may be formed by applying coating material containing fine metallic material (to be called as the "metal coating" hereinafter) or coating material containing carbon fiber (to be called as the "carbon coating" hereinafter) to the site to be neutralized. Specifically, each disc-shaped metal piece contained in the metal coating is individually curved to have a U-shaped cross-section thereby causing the corona discharge from an edge of the metal piece. Likewise, in the carbon coating, the corona discharge is caused at a leading end of each of the carbon fibers.

Instead, a metal sheet made of material having high electric conductivity such as gold, silver, copper aluminum etc. may also be used as the self-discharge device. In this case, the self-discharge device may be attached to the site to be neutralized through adhesive agent made of conductive material, and knurling or hairline finish may be applied to form fine projections on a surface of the self-discharge device. In a case of thus using the metal sheet as the self-discharge device, the corona discharge may be caused at the projections and an edge of the metal sheet.

As described, as a result of the corona discharge from the self-discharge device, ions charged to an opposite polarity to the polarity of the self-discharge device are produced in the airflow flowing along a surface of the self-discharge device and in the vicinity of the self-discharge device. Consequently, the static electricity accumulating on the site to which the self-discharge device is attached and in the vicinity of the self-discharge device may be neutralized by the ions contained in the airflow. In other words, a difference in the electrical potentials of the ionized air and the site to be neutralized is reduced. As a result of an experimentation conducted by the inventors of the present disclosure, it was confirmed that the static electricity can be eliminated by the self-discharge device within an area around 100 mm from an outer edge of the self-discharge device. However, it is considered that an amount of the corona discharge from the self-discharge device may be changed to achieve such effective area of the self-discharge device to neutralize static electricity by changing amount of the metallic material or the carbon fiber material contained in the coating material or by changing a number of the projections formed on the sheet material.

An amount of the corona discharge from the self-discharge device is also increased with an increase in the potential of static electricity accumulating on the self-discharge device. According to the embodiment, therefore, the self-discharge device is attached to a predetermined member that is electrically charged easier than metal members, and the predetermined member is electrically connected to the vehicle body 13 to conduct static electricity to the predetermined member.

According to the embodiment, the predetermined member includes members made of resin material such as an engine cover as a cover member, a cylinder head cover, a duct (or an air hose) to supply air to the engine and so on. Hereinafter, an example of attaching the self-discharge device to the engine cover will be explained.

Figure 4:
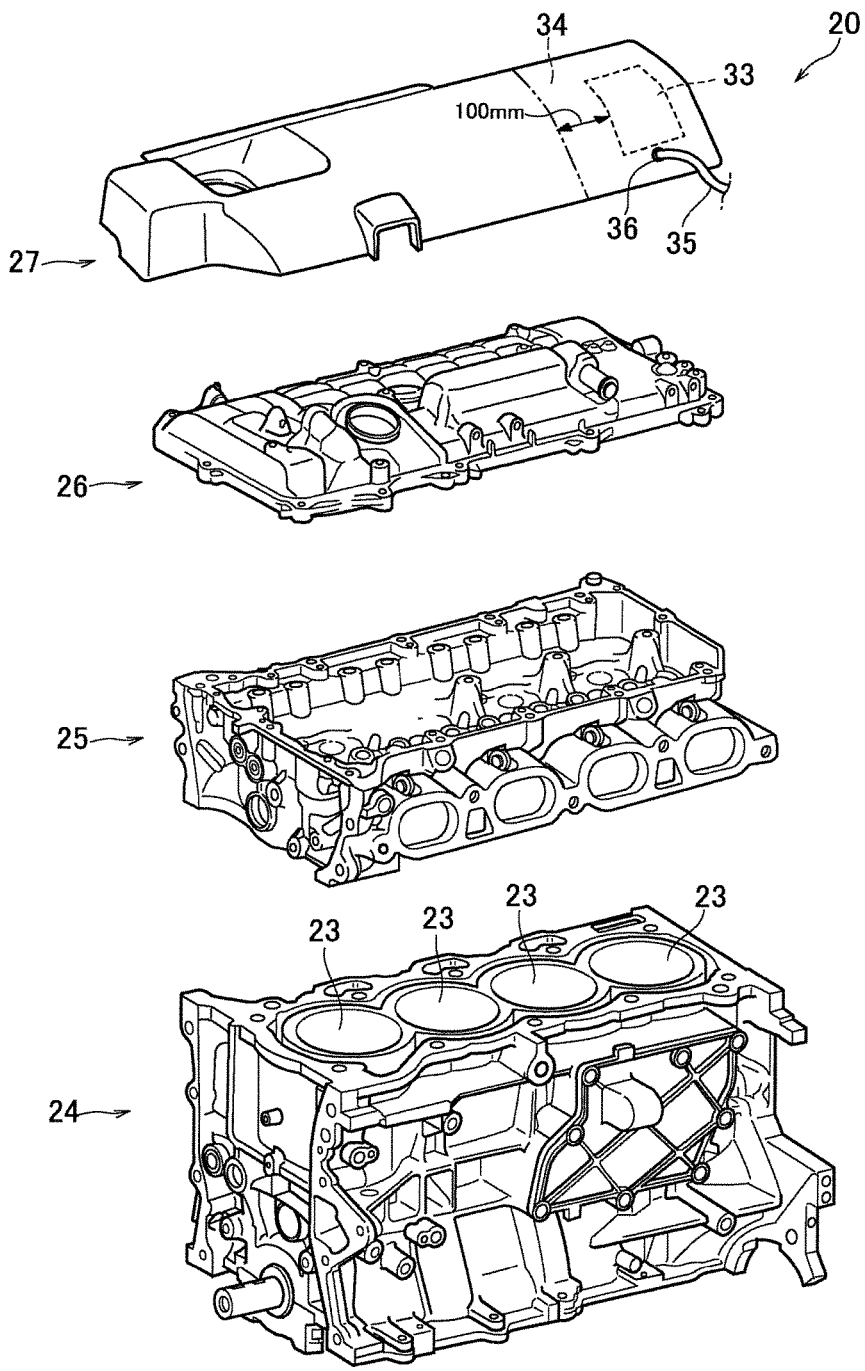
FIG. 4 is an exploded view showing an engine.

Turning to FIG. 4, there is shown an exploded view of the engine 20. As illustrated in FIG. 4, the engine 20 includes a cylinder block 24 having a plurality of cylinder bores 23 opening upwardly, a cylinder head 25 having an ignition device and valves (neither of which are shown) that closes openings of the cylinder block 24, and a cylinder head cover 26 covering the cylinder head 25 from above. In addition, an engine cover 27 is attached to an upper portion of the cylinder head cover 26 from above to cover the cylinder head cover 26 while improving the appearance of the engine 20. The engine cover 27 is also made of resin material such as polypropylene on which static electricity accumulates easier than metallic material. In FIG. 4, although an upper surface of the engine cover 27 is illustrated as a smooth surface for the sake of illustration, a profile of the upper surface of the engine cover 27 may be changed according to need to improve design or the like.

Figure 5:
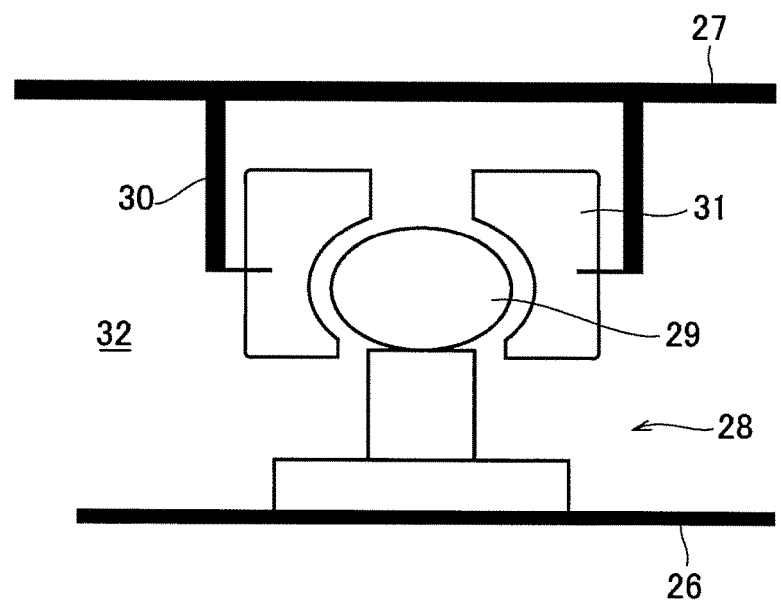
FIG. 5 is a schematic illustration showing an installation example of an engine cover onto a cylinder head cover.

An example of a fixing structure for fixing the engine cover 27 to the cylinder head cover 26 is shown in FIG. 5. In the example shown in FIG. 5, a projection 28 made of metallic material is fixed to an upper surface of the cylinder head cover 26. For example, the projection 28 may be fixed to the upper surface of the cylinder head cover 26 by screwing a male screw protruding from the projection 28 toward the cylinder head cover 26 into a female screw formed on the cylinder head cover 26. Alternatively, the projection 28 may also be fixed to the upper surface of the cylinder head cover 26 through a double-faced adhesive tape.

A spherical head 29 is formed on a leading end of the projection 28, and a socket 30 is formed on a lower surface of the engine cover 27 to be fitted onto the spherical head 29. Specifically, a cylindrical clamp 31 made of rubber is attached to an inner circumferential face of the socket 30, and the spherical head 29 is fitted into the clamp 31 to fix the engine cover 27 to the cylinder head cover 26. As can be seen from FIG. 5, the engine cover 27 is fixed to the cylinder head cover 26 while keeping a clearance 32 between the lower surface of the engine cover 27 and the upper surface of the cylinder head cover 26 so that the air introduced to the engine room 16 is allowed to flow through the clearance 32.

Although only one pair of the projection 28 and the socket 30 is illustrated in FIG. 5, a plurality of the projections 28 are formed along an outer edge of the cylinder head cover 26, and a plurality of the sockets 30 are formed along an outer edge of the engine cover 27.

Thus, the engine cover 27 is attached to the cylinder head cover 26 of the engine 20 through the clamps 31 made of rubber whose electrical conductivity is low. For this reason, static electricity accumulating on the engine cover 27 is not easily to be conducted to the vehicle body 13 and the engine 20. In other words, an electrical resistance between the vehicle body 13 and the engine cover 27 is kept to be greater than a "second predetermined value" at which static electricity accumulating on the engine cover 27 cannot be conducted to the vehicle body 13. The second predetermined value may be set not only to a value identical to the electrical resistance between the vehicle body 13 and the road surface, but also to a different value from the electrical resistance between the vehicle body 13 and the road surface. According to the embodiment, therefore, static electricity conducted to the engine cover 27 from another member and static electricity generated on the engine cover 27 accumulate on the engine cover 27, and consequently the potential of the engine cover 27 is increased.

As described, the engine cover 27 covers the engine 20 from above, and a major part of the engine cover 27 is substantially flat. In this example, therefore, the metal coating is applied to a flat part of the lower surface of the engine cover 27, and the above-explained sheet is attached to the lower surface of the engine cover 27 around the metal coating. That is, the self-discharge device 33 illustrated by a dashed-line in FIG. 4 includes the metal coating and the sheet.

When static electricity accumulate on the engine cover 27 within a predetermined area around the self-discharge device 33, the corona discharge is caused according to the potential of the static electricity. Consequently, ions charged to an opposite polarity to the polarity of the engine cover 27 are produced in the air, and the ionized air is attracted to the self-discharge device 33 to neutralize the static electricity accumulating around the self-discharge device 33.

In the engine cover 27, an area defined by the two-dotted line around the self-discharge device 33 is a neutralizing area 34 as a first area neutralized by the self-discharge device 33, and one of end portion of a conducting wire 35 as a bundle of copper wires is electrostatically connected to the neutralizing area 34. In order to reduce an electrical resistance of the conducting wire 35, copper wires having comparatively large diameters are used to form the conducting wire 35. Other end portion of the conducting wire 35 is electrostatically connected to the negative terminal 11 to connect the neutralizing area 34 to the negative terminal 11. Alternatively, a plate member made of highly conductive material such as metallic material may also be used instead of the conducting wire 35 to connect the engine cover 27 to the negative terminal 11.

Figure 6:
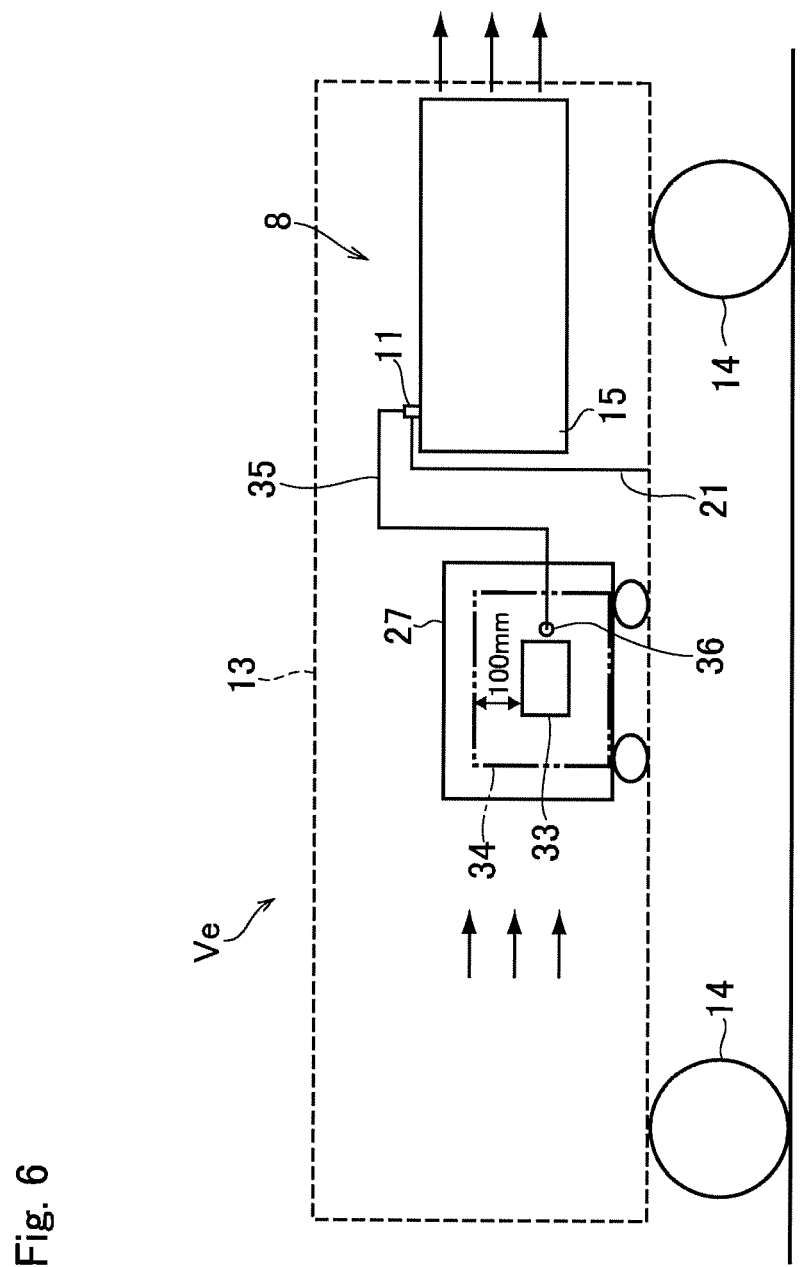
FIG. 6 is a schematic view showing electrical connections among the vehicle body, a negative terminal of the battery, a conducting wire, and the engine cover.

Turning to FIG. 6, there is shown an electrical connection in the vehicle Ve. As described, the electrical resistance between the vehicle body 13 and the engine cover 27 is set to the second predetermined value at which the static electricity accumulating on the engine cover 27 cannot be conducted to the vehicle body 13. In the vehicle Ve, specifically, the vehicle body 13, an earth cable 21, the negative terminal 11 of the battery 8, the conducting wire 35, and the engine cover 27 are electrically connected in order. As also described, since the engine cover 27 is made of resin, a potential of static electricity accumulating on the engine cover 27 is raised to the highest level. By contrast, since the battery 8 and the electrical device 7 are grounded to the vehicle body 13, a potential of static electricity accumulating on the vehicle body 13 is reduced to the lowest level. Accordingly, the potential is highest from the engine cover 27, the conducting wire 35, the negative terminal 11 of the battery 8, the earth cable 21 and the vehicle body 13. As indicated by arrows in FIG. 6, the air flowing along the surface of the engine cover 27 and flowing through the clearance 32 between the engine cover 27 and the cylinder head cover 26 further flows out of the vehicle Ve. That is, the clearance 32 between the engine cover 27 and the cylinder head cover 26 is not closed.

In FIGS. 5 and 6, a reference numeral 36 represents a connection between the engine cover 27 and the conducting wire 35, and the conducting wire 35 serves as a conducting member of the embodiment.

Connections between the engine cover 27 and the conducting wire 35, and between the negative terminal 11 and the conducting wire 35 are not limited to a specific method. For example, the earth cable 21 may be connected to the negative terminal 11 by fitting a ring connector attached to one end of the earth cable 21 onto a male thread formed around the negative terminal 11 erected on the insulation case 15. Likewise, the conducting wire 35 may also be connected to the negative terminal 11 by fitting a ring connector attached to one end of the conducting wire 35 onto the negative terminal 11 together with the earth cable 21, and thereafter screwing a nut onto the terminal 11 to tighten the ring connectors of the earth cable 21 and the conducting wire 35 between the nut and the insulation case 15. Instead, the earth cable 21 and the conducting wire 35 may also be connected directly to the negative terminal 11 by wrapping end portions of the earth cable 21 and the conducting wire 35 around the male thread of the negative terminal 11. In addition, the engine cover 27 may also be connected to the negative terminal 11 through the conducting wire 35 by clamping an internal projection protruding inwardly from a bottom face of the engine cover 27 by a clip attached to one end of the conducting wire 35, and clamping the negative terminal 11 by a clip attached to other end of the conducting wire 35. In this case, it is preferable to apply conductive grease containing copper to the portions clamped by the clips so as to reduce an electrical resistance.

As described, static electricity accumulating on the neutralizing area 34 is neutralized by the self-discharge device 33 and hence the potential an around the neutralizing area 34 is reduced. Consequently, static electricity accumulating on the negative terminal 11 of the battery 8 is conducted to the neutralizing area 34 through the conducting wire 35 according to a difference in potential between the neutralizing area 34 and the negative terminal 11. That is, static charges on the negative terminal 11 of the battery 8 are conducted to the neutralizing area 34 so that the potential of the negative terminal 11 is reduced. Consequently, when the potential of the negative terminal 11 falls below the potential of the vehicle body 13, static charges on the vehicle body 13 is conducted to the negative terminal 11 through the earth cable 21 so that the potential of the vehicle body 13 is reduced. Thus, the vehicle body 13 is connected to the neutralizing area 34 through the earth cable 21, the negative terminal 11 of the battery 8 and the conducting wire 35 so that static electricity accumulating on the vehicle body 13 can be neutralized though the engine cover 27.

Figure 7:
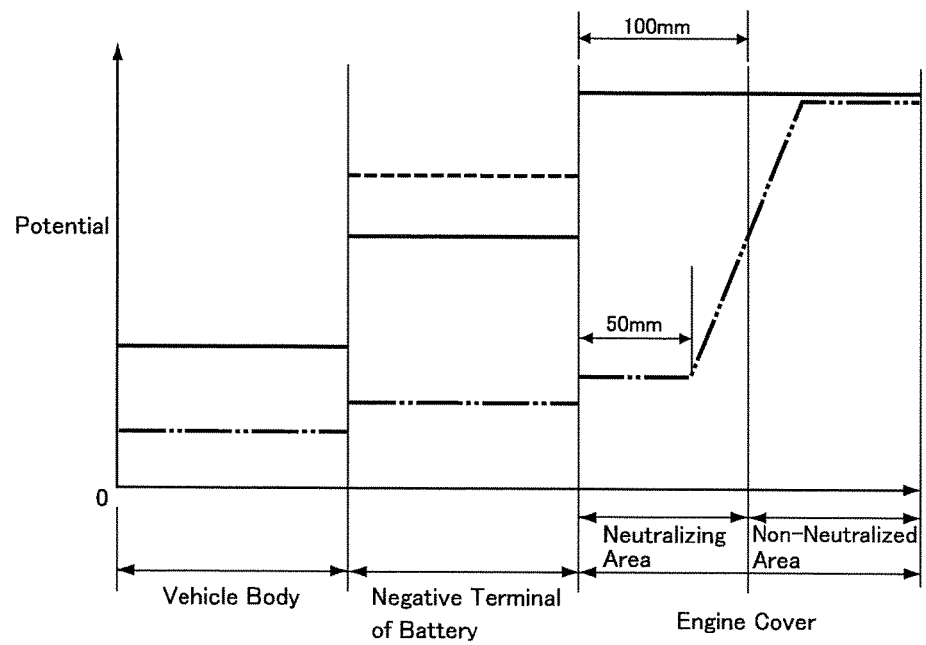
FIG. 7 is a graph indicating neutralization of static electricity.

Turning to FIG. 7, there is shown a graph indicating the above-explained neutralization of static electricity. In FIG. 7, the vertical axis represents static potential, and the horizontal axis represents the vehicle body 13, the negative terminal 11 of the battery 8, and the engine cover 27 including the neutralizing area 34 and a non-neutralized area around the neutralizing area 34. In the neutralizing area 34, an area within 50 mm from the outer edge of the self-discharge device 33 is a most effective area to be neutralized. In FIG. 7, each solid line represents a potential of a case in which the self-discharge device 33 is not arranged, and each two-dotted line a potential of a case in which the self-discharge device 33 is arranged.

First of all, the potential of the case in which the self-discharge device 33 is not arranged will be explained. As described, the vehicle body 13 is electrostatically insulated from the road surface by the tires 14 made of rubber. For this reason, the vehicle body 13 is electrostatically charged by friction acting between the airflow and the vehicle body 13, and repetition of contact and isolation of the tread surface T to/from the road surface. In addition, since the electrical device 7 electrically connected to the battery 8 is grounded to the vehicle body 13, static electricity resulting from activation of the electrical device 7 is also conducted to the vehicle body 13.

As also described, the insulation case 15 of the battery 8 is made of resin, and the negative terminal 11 is connected to the vehicle body 13 through the earth cable 21. Therefore, static charges on the vehicle body 13 is conducted to the negative terminal 11 through the earth cable 21, and the insulation case 15 (including the board in the battery 8) is charged with high potential of the negative terminal 11. As a result of such rise in the potential of the insulation case 15 of the battery 8, potential of the negative terminal 11 is raised relatively. In FIG. 7, the potential of the insulation case 15 of the battery 8 is indicated by the dashed line.

The negative terminal 11 is also connected to the neutralizing area 34 of the engine cover 27 through the conducting wire 35. Specifically, the engine cover 27 made of resin is connected to the cylinder head cover 26 through the clamp 31 made of rubber. That is, an electrical resistance between the engine cover 27 and the cylinder head cover 26 is large, and an electrical conductivity of the engine cover 27 is small. For these reasons, the static electricity conducted to the neutralizing area 34 from the negative terminal 11 through the conducting wire 35 will not be further conducted smoothly to the cylinder head cover 26. Consequently, since the engine cover 27 is made of resin, the static electricity is built up in the engine cover 27, and the potential of the neutralizing area 34 is raised higher than the potential of the negative terminal 11. An electrical resistance of the conducting wire 35 is set to a relatively small third predetermined value that allows the static electricity accumulating on the negative terminal 11 to be conducted sufficiently to the neutralizing area 34.

Here will be explained an action of the self-discharge device 33 attached to the engine cover 27 with reference to FIG. 7. In the engine cover 27, the static electricity accumulating on the neutralizing area 34 is neutralized by the self-discharge device 33 so that the potential of the neutralizing area 34 is reduced. As indicated in the neutralizing area in FIG. 7, the potential of the area within 50 mm from the outer edge of the self-discharge device 33 may be reduced to the same level as that of a portion to which the self-discharge device is attached. The potential of the neutralizing area 46 increases with the increasing distance from the portion 50 mm away from the outer edge of the self-discharge device 33. By contrast, the potential of the non-neutralized area decreases with the decreasing distance to the neutralizing area 34. That is, although the engine cover 27 is made of resin whose electrical conductivity is low, the static electricity accumulating on the non-neutralized area is conducted toward the neutralizing area 34 at which the potential thereof is low.

As a result of such reduction in the potential of the neutralizing area 34 of the engine cover 27, the potential of the negative terminal 11 becomes higher than the potential of the neutralizing area 34 so that the static electricity accumulating on the negative terminal 11 is conducted to the neutralizing area 34 through the conducting wire 35. That is, the potential of the negative terminal 11 is reduced. In this situation, the corona discharge is caused at the self-discharge device 33 by the static electricity conducted to the neutralizing area 34, and consequently the neutralizing area 34 is neutralized. As described, the potential is reduced to the lowest level the area within 50 mm from the outer edge of the self-discharge device 33, it is preferable to connect the leading end of the conducting wire 35 to the portion of the neutralizing area 34 50 mm away from the outer edge of the self-discharge device 33. Instead, the leading end of the conducting wire 35 may also be connected directly to the self-discharge device 33.

As a result of reduction in the potential of the negative terminal 11, the potential of the vehicle body 13 and the potential of the insulation case 15 of the battery 8 are also reduced by the same principle of the reduction in the potential of the negative terminal 11.

Consequently, the static electricity accumulating on the vehicle body 13 is conducted to the neutralizing area 34 of the engine cover 27 through the conducting wire 35 to be neutralized by the self-discharge device 33 and the external airflow. For this reason, the potential of the vehicle body 13 is reduced so that repulsive force acing between the airflow and the surface of the vehicle body 13 can be reduced to ensure desired aerodynamic characteristics of the vehicle Ve. As a result, desired acceleration and turning performance of the vehicle Ve can be ensured.

In addition, as a result of eliminating the static electricity from the battery 8 (and the insulation case 15), voltage of the battery 8 may be stabilized to ensure performance of the battery 8. Further, since the electrical device 7 is grounded to the vehicle body 13, the potential of the vehicle body 13 is reduced so that the electrical device 7 can be controlled in a stable manner. Furthermore, although viscosity or hardness of the grease applied to the slidable portion may be changed by the static electricity, desired viscosity or hardness of the grease may be maintained by neutralizing the static electricity accumulating on the vehicle body 13. For this reason, response time from a commencement of an operation of an accelerator pedal, a brake pedal, a steering wheel or the like may be shortened.

The inventors of the present disclosure conducted an experimentation to find a most effective discharging area of the self-discharge device 33 by propelling the vehicle while changing an area of the self-discharge device 33. According to the present disclosure, a definition of the "effective discharging area" is a surface area of the self-discharge device 33 on which the corona discharge can be caused, and the effective discharging area may be changed depending on a surface profile of the self-discharge device 33. That is, the effective discharging area may not be simply calculated based on a two dimensional figure of the self-discharge device 33.

Figure 8:
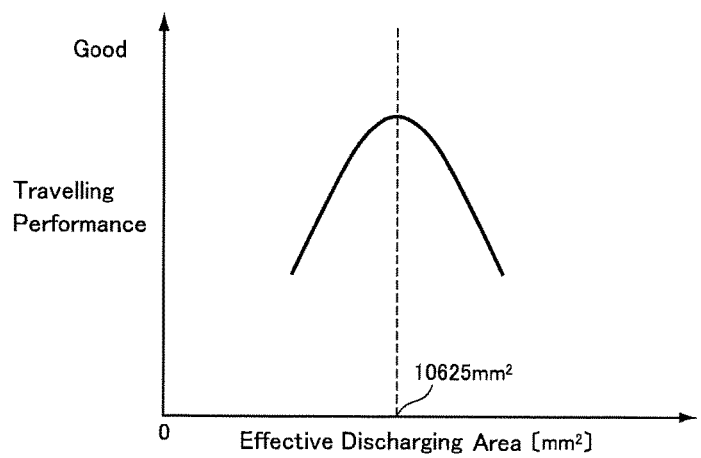
FIG. 8 is a graph indicating a relation between an effective discharging area of a self-discharge device and a driving performance of the vehicle.

A result of the experimentation is shown in FIG. 8. In FIG. 8, the horizontal axis represents the effective discharging area, and the vertical axis represents a travelling performance as a response time from a commencement of an operation of the accelerator pedal, the brake pedal, or the steering wheel. As described, deterioration in acceleration and turning performance can be prevented by neutralizing the static electricity accumulating on the vehicle body 13, and consequently the above-explained response time is shortened. That is, the travelling performance is improved. In FIG. 8, a reduction in the response time is indicated at a higher level.

As can be seen from FIG. 8, the travelling performance is improved with an increase in the effective discharging area until the effective discharging area is increased to a predetermined value. That is, a discharging amount from the self-discharge device 33 is increased until the effective discharging area is increased to the predetermined value.

By contrast, the travelling performance is deteriorated with an increase in the effective discharging area after the effective discharging area is increased to the predetermined value. This is because, once the corona discharge has been caused, it takes a longer time until the potential is built up to a certain level possible to cause the corona discharge if the effective discharging area is larger than the predetermined value. In other words, the corona discharge is not caused temporarily. However, if the effective discharging area is smaller than the predetermined value, the corona discharge may be caused continuously even after a reduction in the potential resulting from the corona discharge.

Thus, in order to cause the corona discharge continuously to neutralize static electricity, it is preferable to adjust the effective discharging area of the self-discharge device 33 to the most effective discharging area. Specifically, based on the result of the experimentation shown in FIG. 8, it was confirmed that the travelling performance is improved to the highest level by using the self-discharge device 33 in which a width thereof was 85 mm, and a length thereof was 125 mm. That is, the most effective discharging area was 10625 mm$^2$. In addition, it was also confirmed that such most effective discharging area is substantially same in different kinds of vehicles such as a hybrid vehicle, an electric vehicle, and an engine vehicle.

In a case of applying the coating material to the engine cover 27 to form the self-discharge device 33, metal or fiber content in the coating may be varied slightly. Likewise, in a case of using the sheet material to form the self-discharge device 33, a surface profile of the sheet material may be varied slightly as a result of applying a surface treatment such as the hairline finish. According to the present disclosure, therefore, the most effective discharging area may be adjusted from 10625 mm$^2$ within a tolerable range.

In order to accurately adjust the effective discharging area of the self-discharge device 33 to the most effective discharging area taking into account of such tolerance of the coating material or the sheet material, the self-discharge device 33 may be formed by attaching a main self-discharge device 33a to a desired site of the engine cover 27, and thereafter attaching an adjuster (or a sub) self-discharge device 33b to the desired site of the engine cover 27 around the main self-discharge device 33a. Thus, the effective discharging area may be a total of an area of the main self-discharge device 33a and an area of the adjuster self-discharge device 33b.

Specifically, the coating material is applied to the desired site of the engine cover 27 to form the main self-discharge device 33a of 10625 mm$^2$ taking account of the plus tolerance, and the connection 36 of the conducting wire 35 is connected to the effective discharging area. At this stage, a first road test is conducted.

Thereafter, the sheet material having a predetermined dimension as the adjuster self-discharge device 33b is attached to the engine cover 27 around the main self-discharge device 33a, and a second road test is conducted. If the travelling performance during the second road test is lower than the travelling performance during the first road test, the area to which the main self-discharge device 33a can be estimated as 10625 mm². In this case, therefore, the adjuster self-discharge device 33b is detached from the engine cover 27 to adjust the effective discharging area of the self-discharge device 33 to 10625 mm².

By contrast, if the travelling performance during the second road test is higher than the travelling performance during the first road test, an additional adjuster self-discharge device 33b is attached to the engine cover 27 and the second road test is repeated. The second road test is repeated until the travelling performance falls below the travelling performance during the previous road test while attaching the additional adjuster self-discharge device 33b to the engine cover 27. When the travelling performance falls below the travelling performance during the previous road test, the additional adjuster self-discharge device 33b attached to the engine cover 27 when conducting the last road test is detached from the engine cover 27 to adjust the effective discharging area of the self-discharge device 33 to 10625 mm².

In addition, a road test was also conducted while attaching the adjuster self-discharge device(s) 33b to the vehicle body 13 at the specific point(s) indicated by black dots in FIG. 3. In this case, the travelling performance was comparative to the travelling performance of the case in which the adjuster self-discharge device(s) 33b is/are attached to the engine cover 27. That is, an expected travelling performance may be achieved by attaching the adjuster self-discharge device(s) 33b not only to the engine cover 27 but also to the specific point(s) of the vehicle body 13 taking account of the aerodynamic characteristics of the vehicle Ve. For example, acceleration of a sports car may be improved by attaching the adjuster self-discharge device(s) 33b to corners between a downwardly slanted plate and a flat plate, and between the flat plate and an upwardly slanted plate at which the airflow deviates from the surface of the vehicle body 13.

If the engine cover 27 is connected directly to vehicle body 13 without through the negative terminal 11 of the battery 8, a difference in the electrical potentials of the neutralizing area 34 in the engine cover 27 and the vehicle body 13 may be widened. Consequently, at least part of the static charges on the neutralizing area 34 migrates to the vehicle body 13 thereby reducing the potential of the self-discharge device 33. In this case, therefore, the corona discharge may not be caused promptly from the self-discharge device 33, and an amount of the corona discharge from the self-discharge device 33 may be decreased.

In order to confirm a change in travelling performance depending on the electrical connection, the inventors of the present disclosure also conducted road tests while changing the connection of the conducting wire 35. In a case A of the road test, one of the end portions of the conducting wire 35 was connected to the negative terminal 11 of the battery 8. In a case B of the road test, one of the end portions of the conducting wire 35 was connected to the earth cable 21. In a case C of the road test, one of the end portions of the conducting wire 35 was connected to the vehicle body 13. Here, since the negative terminal 11 and the vehicle body 13 are connected through the earth cable 21, the potential of the earth cable 21 is lower than the potential of the negative terminal 11 but higher than the potential of the vehicle body 13.

Figure 9:
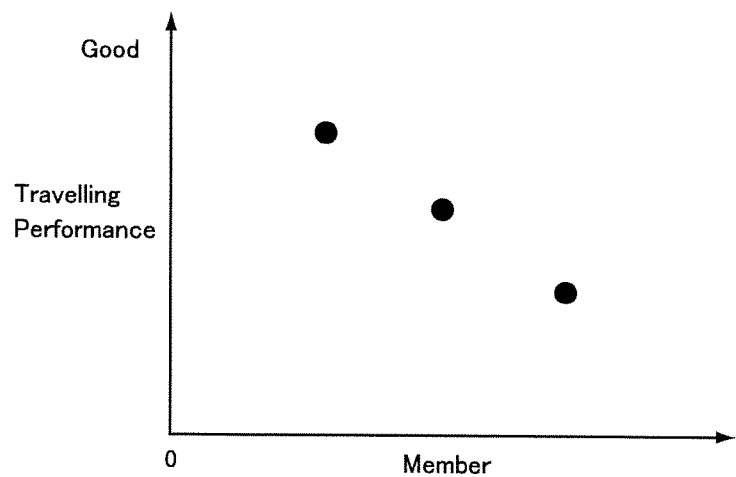
FIG. 9 is a graph indicating a relation between a member connecting the conducting wire and a driving performance of the vehicle.

Results of the road tests are shown in FIG. 9. In FIG. 9, the horizontal axis represents a member to which one of the end portions of the conducting wire 35 was connected, and the vertical axis represents the travelling performance as a response time from a commencement of an operation of the accelerator pedal, the brake pedal, or the steering wheel. That is, an improvement of the travelling performance as a reduction in the response time is indicated at a higher level.

As can be seen from FIG. 9, the travelling performance of the case A is highest, and the travelling performance of the case B is second highest, and the travelling performance of the case C is lowest. As described, the potential is highest from the negative terminal 11, the earth cable 21, and the vehicle body 13. Accordingly, as a result of the road tests, it was confirmed that it is preferable to connect the engine cover 27 to the vehicle body 13 through a member in which the electrical potential thereof is closest to that of the engine cover 27.

Here will be explained a manufacturing method of the vehicle Ve. As known in the art, first of all, the battery 8 and the tires 14 are attached to the vehicle body 13. Then the engine cover 27 is attached to the cylinder head cover 26 in such a manner that an electrical resistance between the vehicle body 13 and the engine cover 27 is kept to the second predetermined value at which static electricity accumulating on the engine cover 27 cannot be conducted to the vehicle body 13. At this stage, the self-discharge device 33 is attached to the engine cover 27, and the negative terminal 11 of the battery 8 is connected to the neutralizing area 34 through the conducting wire 35.

Preferably, the self-discharge device 33 is attached to the engine cover 27 within the most effective discharging area found by the above-explained experimentation.

At this stage, if the most effective discharging area has not yet been found, the main self-discharge device 33a is attached or applied to the engine cover 27 in a predetermined area, and conduct the above-explained first road test to determine whether or not the aerodynamic characteristics of the vehicle Ve fulfill a predetermined criterion. If the aerodynamic characteristics have not yet fulfilled the criterion, the adjuster self-discharge device 33b is attached to the engine cover 27 or the vehicle body 13, and the second road test is conducted. As described, the second road test is repeated until the aerodynamic characteristics fulfill the criterion while increasing the number of the additional adjuster self-discharge device 33b. In the case of attaching the adjuster self-discharge device(s) 33b to the engine cover 27, specifically, the connection 36 of the conducting wire 35 is connected to the effective discharging area of the adjuster self-discharge device(s) 33b.

As described, the self-discharge device 33 may also be attached to the cylinder head cover 26 made of resin instead of the engine cover 27. In addition, since the self-discharge device 33 is adapted to neutralize static electricity by producing ions charged to an opposite polarity to the polarity of the self-discharge device 33 itself, it is preferable to attach the self-discharge device 33 to a portion contacted to the airflow such as an upper face of the engine cover 27.

Figure 10:
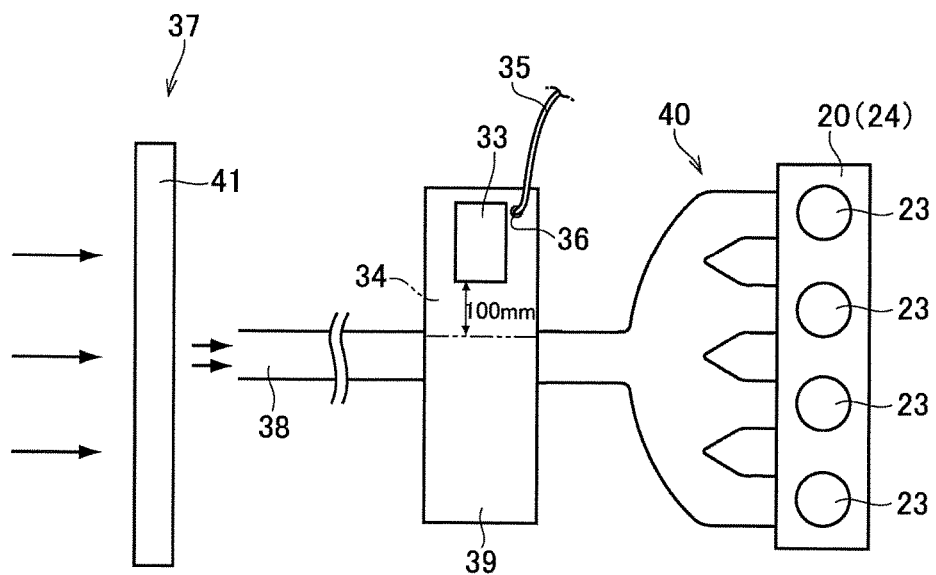
FIG. 10 is a schematic illustration showing one example of an air-intake of the engine.

Turning to FIG. 10, there is shown one example of a structure of an air-intake of the engine 20. As illustrated in FIG. 10, a radiator 37 is arranged in a front part of the engine room 16 to introduce external air into the engine room 16, and an intake duct 38 is disposed on a rear side of the radiator 37. In order to capture contaminants contained in the air, an air cleaner 39 is connected to an appropriate portion of the intake duct 38. An opening end of the intake duct 38 is opened toward the radiator 37, and intake manifolds 40 are formed on the other end of the intake duct 38 to be individually connected to the cylinder bores 23 so that the air introduced into the intake duct 38 is further introduced to each of the cylinder bores 23. A radiator cover 41 covering the radiator 37, the intake duct 38, the air cleaner 39, and the intake manifolds 40 are made of resin on which static electricity accumulates easier than metallic material. In the engine room 16, therefore, the self-discharge device 33 may also be attached to an outer surface of the radiator cover 41, the intake duct 38, the air cleaner 39 or the intake manifolds 40 instead of the engine cover 27. In FIG. 10, the self-discharge device 33 is attached to the outer surface of the air cleaner 39, and the neutralizing area 34 is defined by the two-dotted line.

Figure 11:
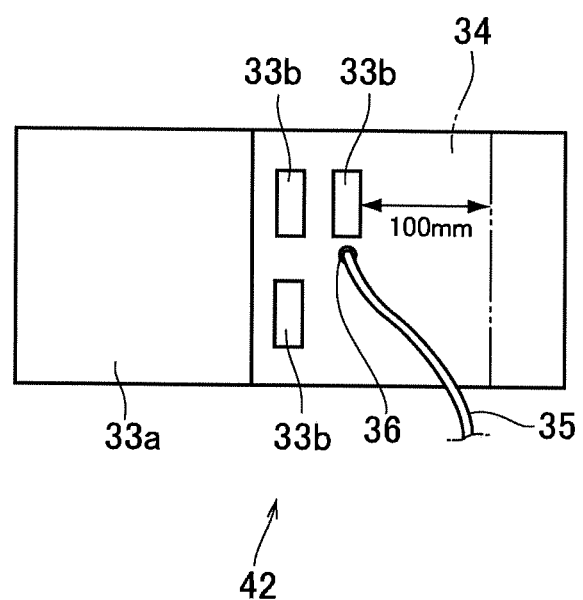
FIG. 11 is a schematic illustration showing an example of attaching the self-discharge device to a plate made of resin.

In the vehicle Ve that has already been assembled, the self-discharge device 33 may also be attached to the desired site through a resin plate 42 as shown in FIG. 11. In this case, the resin plate 42 to which the self-discharge device 33 may be attached to the desired sites of the vehicle body 13, the engine cover 27, the cylinder head cover 26, the intake duct 38 and so on.

In the example shown in FIG. 11, specifically, the coating material is applied to a predetermined portion of the resin plate 42 to form the main self-discharge device 33a, and the sheet material is attached to the remaining portion(s) of the resin plate 42 to serve as the adjuster self-discharge device(s) 33b. In this case, the resin plate 42 is attached to the second predetermined member such as the engine cover 27 in such a manner that the main self-discharge device 33a and the adjuster self-discharge device(s) 33b are exposed to the external airflow. In FIG. 11, the neutralizing area 34 is defined by the two-dotted line.

Although the above exemplary embodiments of the present application have been described, it will be understood by those skilled in the art that the present application should not be limited to the described exemplary embodiments, and various changes and modifications can be made within the scope of the present disclosure. For example, the engine cover 27 includes a side cover covering a side of the engine 20 and a bottom cover covering a bottom of the engine 20. Further, the self-discharge device 33 may also be attached to the motor 6, and to a cover of a fuel cell, the insulation case 15 of the battery 8 and so on. Furthermore, the battery 8 may be covered by a thermal insulation cover made of resin while keeping a predetermined clearance from the insulation case 15 to thermally protect the battery 8. In this case, potential of the thermal insulation cover is raised by an electrostatic induction resulting from rise in potential of the insulation case 15, and hence the self-discharge device 33 may also be attached to thermal insulation cover.

What is claimed is:

1. A vehicle, comprising:
a vehicle body sustained by a plurality of tires in such a manner that an electrical resistance between each of the tires and a road surface is kept to be greater than a first predetermined value;
a battery that supplies electricity to a predetermined electrical device;
an earth cable that electrically connects a negative terminal of the battery to the vehicle body;
a predetermined member that is connected to the vehicle body while keeping an electrical resistance between the predetermined member and the vehicle body greater than a second predetermined value;
a main self-discharge device that decreases a potential of the predetermined member by causing a self-discharge to produce ions charged to an opposite polarity to a polarity of the predetermined member in an airflow flowing along a surface of the predetermined member according to the potential; and
a conducting member that connects a neutralizing area of the predetermined member that is neutralized by the main self-discharge device to the negative terminal of the battery or the earth cable while keeping an electrical resistance between the neutralizing area and the negative terminal or the earth cable smaller than a third predetermined value.

2. The vehicle as claimed in claim 1, wherein the predetermined member is made of material that is electrically charged with less resistance than metal material.

3. The vehicle as claimed in claim 1, wherein the predetermined member is made of resin material.

4. The vehicle as claimed in claim 3, further comprising:
a prime mover; and
a cover member that covers the prime mover,
wherein the predetermined member includes the cover member.

5. The vehicle as claimed in claim 3, further comprising:
an engine serving as a prime mover,
wherein the engine includes a cylinder block having a plurality of cylinder bores, a cylinder head that closes the cylinder bores of the cylinder block, and a head cover that covers the cylinder head, and
wherein the predetermined member includes the head cover.

6. The vehicle as claimed in claim 3, further comprising:
a prime mover; and
a duct that allows external air to flow toward the prime mover, and wherein the predetermined member includes the duct.

7. The vehicle as claimed in claim 3, further comprising:
a plate member to which the main self-discharge device is attached,
wherein the plate member is attached to the predetermined member.

8. The vehicle as claimed in claim 1, wherein the main self-discharge device includes a coating material that is applied to an outer surface of the predetermined member.

9. The vehicle as claimed in claim 8, wherein the coating material contains at least one of metallic material and carbon fiber.

10. The vehicle as claimed in claim 1,
wherein the main self-discharge device covers a predetermined area of the outer surface of the predetermined member, and
further comprising a sub self-discharge device that is applied to the predetermined member at a different site from a site to which the main self-discharge device is applied, and
wherein the sub self-discharge device is adapted to decrease the potential of the predetermined member by causing a self-discharge to produce ions charged to the opposite polarity of the polarity of the predetermined member in the airflow flowing along the surface of the predetermined member according to the potential.

11. The vehicle as claimed in claim 1, further comprising:
a sub self-discharge device that is applied to a specific point of the vehicle body, and wherein the sub self-discharge device is adapted to decrease the potential of the predetermined member by causing a self-discharge to produce ions charged to the opposite polarity of the polarity of the predetermined member in the airflow flowing along the surface of the predetermined member according to the potential.

12. The vehicle as claimed in claim 1, wherein a surface area of the main self-discharge device is determined in such a manner as to achieve predetermined aerodynamic characteristics.

13. The vehicle as claimed in claim 12,
wherein the surface area includes an effective discharging area to cause the self-discharge, and
wherein the effective discharging area is 10625 mm2.

14. The vehicle as claimed in claim 10, wherein the surface area of the main self-discharge device and a surface area of the sub self-discharge device are determined in such a manner as to achieve predetermined aerodynamic characteristics in total.

15. The vehicle as claimed in claim 14,
wherein the surface areas of the main self-discharge device and the sub self-discharge device include an effective discharging area to cause the self-discharge, and
wherein a total surface area of the main self-discharge device and the sub self-discharge device is 10625 mm2.

16. The vehicle as claimed in claim 1, wherein one of end portions of the conducting member is connected to an area within 100 mm from an outer edge of the self-discharge device.

* * * * *